United States Patent
Zhang et al.

(10) Patent No.: US 8,904,406 B2
(45) Date of Patent: Dec. 2, 2014

(54) COORDINATION OF TASKS EXECUTED BY A PLURALITY OF THREADS USING TWO SYNCHRONIZATION PRIMITIVE CALLS

(75) Inventors: Bin Zhang, Fremont, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1525 days.

(21) Appl. No.: 12/512,256

(22) Filed: Jul. 30, 2009

(65) Prior Publication Data

US 2011/0029975 A1    Feb. 3, 2011

(51) Int. Cl.
 G06F 9/46    (2006.01)
 G06F 9/52    (2006.01)

(52) U.S. Cl.
 CPC . *G06F 9/52* (2013.01); *G06F 9/522* (2013.01)
 USPC ........................................ 718/106

(58) Field of Classification Search
 None
 See application file for complete search history.

(56) References Cited

U.S. PATENT DOCUMENTS 7,346,902 B2 *   3/2008  Dutt et al. .................... 717/149
2007/0143755 A1 * 6/2007  Sahu et al. ................... 718/100

OTHER PUBLICATIONS

Barney et al., Introduction to Parallel Computing, http://computing.llnl.gov/tutorials/parallel_comp/ dated Jan. 26, 2009 (pp. 1-50).
A Tutorial on Parallel Systems Development, Book Review by Michael J. Quinn dated on or before Jul. 21, 2009 (2 pages).
Quinn et al., OpenMP, Wikipedia dated Jul. 7, 2009 (pp. 1-11).

* cited by examiner

*Primary Examiner* — Meng An
*Assistant Examiner* — Eric C Wai

(57) ABSTRACT

To coordinate tasks executed by a plurality of threads that each includes plural task sections, a call of a mark primitive to mark a first point after a first of the plural task sections is provided. Also, a call of a second primitive is provided to indicate that a second of the plural task sections is not allowed to begin until after the plurality of threads have each reached the first point.

20 Claims, 3 Drawing Sheets

300 — 
```
Struct {
    Int counter;
    Bool flag;
    Int group_size; // the number of threads calling Mark().
} group_of_threads;
```

302 —
Each thread will execute the following sequence of the code:

Initialization of the data structure:
// Option: the first thread that calls the Mark() can be responsible for initializing the structure
// if every thread in the group knows how many other threads are in the group
```
If (group_of_threads.counter == group_of_threads.group_size) {
    group_of_threads.group_size = number of parallel threads to be synchronized.
    group_of_threads.counter = 0;
    group_of_threads.flag = 0;
}
```

304 —
```
Mark()
{
    Lock structure group_of_threads;
    group_of_threads.counter ++;
    Unlock structure group_of_threads;
    Return;
}
```

306 —
```
AfterAll()
{
    Lock structure group_of_threads;

If (group_of_threads.counter == group_of_threads.group_size) {
        group_of_threads.flag = 1;  // the last one is done
        Unlock structure group_of_threads;
        Return;
    }
    Unlock structure group_of_threads;
    Wait while (group_of_threads.flag == 0);
}
```

FIG. 3

COORDINATION OF TASKS EXECUTED BY A PLURALITY OF THREADS USING TWO SYNCHRONIZATION PRIMITIVE CALLS

BACKGROUND

Multiple threads can execute in a computer. A "thread" refers to a processing unit associated with software. In a multiprocessing environment, multiple threads can execute in parallel. A multiprocessing system can include multiple processors, or alternatively, a multiprocessing system can include a processor having multiple processor cores.

An issue associated with parallel execution of threads in a computer is maintaining coordination among tasks executed by the threads. For example, it may be desired that all data be read from a particular source before any of the data in the source is modified by a subsequent write operation—otherwise, data corruption may occur during the read process.

BRIEF DESCRIPTION OF THE DRAWINGS

Some embodiments of the invention are described with respect to the following figures:

FIG. 3 illustrates an example of code sections for the coordination mechanism according to an embodiment.

DETAILED DESCRIPTION

Figure 1:
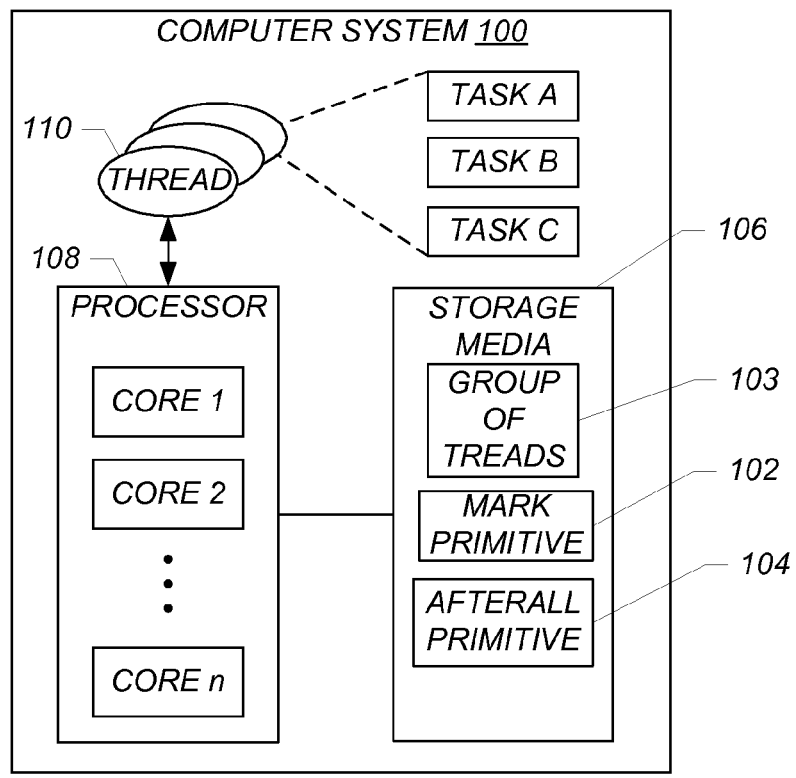
FIG. 1 is a block diagram of an exemplary computer system in which multiple threads are executable, and in which a coordination mechanism according to an embodiment is employed.

Conventionally, a synchronization primitive can be called by threads executing in a computer system to establish synchronization among tasks performed by the threads. Such a synchronization primitive is typically implemented with a high-level programming language, such as C or pseudo C. Use of the synchronization primitive is relatively convenient to programmers since programmers do not have to concern themselves with low-level variables that may be associated with low-level synchronization mechanisms such as mutexes, condition variables, or other low-level synchronization mechanisms. Low-level variables are relatively complicated to use, and may not be understood well by many programmers.

An issue associated with using traditional synchronization primitives, however, is that usage of the synchronization primitive may not be efficient in many circumstances. For example, use of the synchronization primitive may result in excessive waiting by threads for a first task associated with all threads to complete. Thus, if any one of the threads takes a relatively long time to complete this first task, then all other threads will be delayed until this one thread has completed processing its first task.

In accordance with some embodiments, a coordination mechanism is provided that employs at least two primitives instead of just one synchronization primitive to perform coordination among tasks executed by threads running in the computer system. In the ensuing discussion, reference is made to a coordination mechanism that uses two primitives—however, in alternative embodiments, it is contemplated that more than two primitives can be employed. The two primitives that are part of the coordination mechanism according to some embodiments include a Mark primitive, and a second primitive referred to as an AfterAll primitive. Although reference is made to specific names for the primitives in this discussion, it is noted that other implementations can use other names for the primitives.

Each of the multiple threads executing in a computer system is considered to have multiple task sections. The point in a thread at which the Mark primitive is called is referred to as a marked point, which usually occurs after a first task section in the corresponding thread. The AfterAll primitive can usually be called before the start of a second of the task sections of each thread such that that task section cannot begin until the marked point of each thread has been reached. The AfterAll primitive can be considered to indicate a coordination point in that thread that is related to the marked points of all threads.

To improve performance, in the time between the marked point marked by the Mark primitive and the coordination point at the beginning of the second task section, another task section associated with each thread is allowed to execute. By performing this other task section between the marked point and the coordination point, efficiency can be improved since at least some parts of the threads are allowed to continue to process while the second task sections of the threads are waiting for completion of the first task sections of all threads that are involved in the task coordination process.

The Mark primitive and the AfterAll primitive are high-level primitives written with a computer programming language (such as C or pseudo C), rather than a low-level variable used for synchronization. As a result, the Mark primitive and AfterAll primitive can be called by code associated with each of the threads. By using these high level primitives, programmers do not have to declare, lock, maintain and check the variables involved to implement such coordination mechanisms. With the high level coordination primitives according to some embodiments, programmers can focus their attention on the semantics of the coordination of tasks in various threads rather than the details in their implementation. In addition, by employing two separate primitives, more flexibility is provided to a programmer. In fact, by employing two separate primitives, multiple marked points and corresponding coordination points can be specified, and/or coordination nesting can be performed, as discussed further below. It is noted that if the Mark primitive and AfterAll primitive are called one after another with no code in between within a thread, then this would provide the traditional synchronization primitive.

FIG. 1 illustrates an exemplary computer system 100 in which a coordination mechanism according to an embodiment can be employed. The coordination mechanism is provided in the form of a Mark primitive 102 and an AfterAll primitive 104. The Mark primitive 102 and AfterAll primitive 104 are shown stored in storage media 106, where the storage media 106 can include one or more disk-based storage devices and/or integrated circuit or semiconductor memory devices. The storage media 106 is connected to a multi-core processor 108 that has multiple processor cores (core 1, core 2, ..., core n). In a different implementation, instead of using a multi-core processor, multiple processors can be employed instead.

Also shown as being stored in the storage media 106 is a Group_of_Threads data structure 103 that defines various elements (discussed further below) employed by the Mark primitive 102 and AfterAll primitive to perform task coordination.

The computer system 100 also includes threads 110 that are executable on the multi-core processor 108. In one example, one thread can be executed on a corresponding one of the cores in the multi-core processor 108, such that the multiple threads 110 can execute in parallel and concurrently on respective cores of the multi-core processor 108.

The threads 110 can invoke the Mark primitive 102 and AfterAll primitive 104 by embedding calls to such primitives in the code associated with the threads 110. Note that the threads 110 can be spawned from software code, such as application code, where the programmer has inserted the Mark primitive 102 and AfterAll primitive 104 at desired locations in the code.

In the example of FIG. 1, it is assumed that each thread 110 has multiple task sections, with three task sections shown: task section A, task section B, and task section C.

Figure 2A:
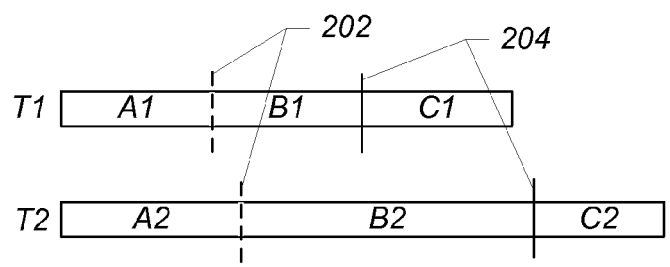
FIGS. 2A-2B illustrate an example of parallel execution of threads that employ the coordination mechanism according to an embodiment.
Figure 2B:
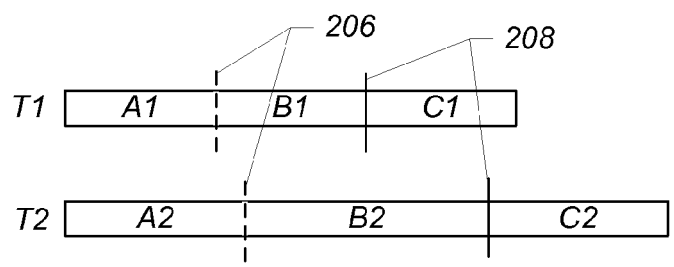

FIGS. 2A and 2B illustrate two different examples in which the Mark primitive and AfterAll primitive are used. It is assumed that there are two threads in each of the examples of FIGS. 2A and 2B. In FIG. 2A, the two threads are T1 and T2. The dashed vertical lines 202 represent the marked points corresponding to calls of the Mark primitive in threads T1 and T2. The marked points 202 occur at the end of each of task sections A1 and A2 of respective threads T1 and T2.

Before the beginning of each of task sections C1 and C2, the AfterAll primitive is called to specify coordination points indicated by solid vertical lines 204. The AfterAll primitive causes the task sections C1 and C2 to wait unit both task sections A1 and A2 have completed before the task sections C1 and C2 can start executing.

As further shown in FIG. 2A, task sections B1 and B2 associated with threads T1 and T2 can execute between the respective points 202 and 204 of each thread, which improves execution efficiency of the threads.

FIG. 2B illustrates a similar example as in FIG. 2A, except that task section B1 of thread T1 is longer such that the task section C1 is still executing when task section C2 of thread T2 begins. Dashed vertical lines 206 represent the marked points (specified by calling the Mark primitive) at the ends of task sections A1 and A2 of threads T1 and T2, and the vertical lines 208 are coordination points specified by the AfterAll primitive before task sections C1 and C2.

The following provides further details regarding the implementation of the Mark and AfterAll primitives. Traditionally, synchronization has been performed using computer code as follows (where Synchronization represents the traditional synchronization primitive):

. . .
Parallel execution of Task $A_i$, i=1, . . . , n
Synchronization( );
Parallel execution of Task $B_j$, j=1, . . . , n
. . .

In the computer code above, lower case n represents the number of threads. In the code above, a single synchronization point is specified by the Synchronization primitive, and task sections B in the threads cannot start until all task sections A have completed.

In contrast, in place of the Synchronization primitive, the Mark primitive and AfterAll primitive according to some embodiments can be used instead, as provided below:

Thread(i):
    task $A_i$
    Mark( );
    task $B_i$
    AfterAll( );

-continued task $C_i$
END
Parallel execution of all Thread(i), i=1,......,n

As seen above, the Mark primitive and AfterAll primitive are separately called such that another task section (B) can be specified between the marked point (associated with the Mark primitive) and the coordination point (associated with the AfterAll primitive).

The implementation complexity associated with using the Mark primitive and the AfterAll primitive is no more complex than the implementation for the Synchronization primitive. The functions of the Mark primitive and AfterAll primitive can be implemented using the computer code (pseudo C code, for example) shown in FIG. 3.

In the computer code of FIG. 3, a structure group_of_threads (300) is defined, where this structure has the following elements: counter (which is a counter that is incremented when each thread calls the Mark primitive); flag (to indicate that the last thread from among the group of threads has completed processing of the respective task section that ends with the Mark primitive); and group_size (which represents the number of threads in the group of threads that are calling the Mark primitive).

Initialization code 302 represents initialization performed on the group_of_threads structure 300. Basically, the initialization code 302 causes the value of group_size to be initialized to the number of parallel threads to be coordinated, the value of counter to be reset to zero, and the value of flag to be reset to zero. The initialization code 302 is performed each time the counter of the group_of_threads structure 300 reaches the group_size value.

The code for the Mark primitive is represented as 304 in FIG. 3. As noted above, the Mark primitive increments the counter element in the group_of_threads structure 300 whenever the Mark primitive is called by the corresponding thread. This is represented by group_of_threads.counter++ in the Mark primitive code 304. Thus, if there are n threads executing in parallel all calling the Mark primitive, then the counter element of the group_of_threads structure 300 (group_of_threads.counter) will be incremented n times to reach the group_size value specified in the group_of_threads structure 300 (group_of_threads.group_size).

Note that prior to updating any element of the group_of_threads structure 300, the group_of_threads structure 300 is locked to prevent other threads from accessing the content of the group_of_threads structure 300 (to avoid any conflicts). This is achieved by using the Lock command in the Mark primitive code 304. After updating the counter element by incrementing the counter element, the group_of_threads structure 300 can be unlocked (using the Unlock command) in the Mark primitive code 304.

The code for the AfterAll primitive is represented as 306 in FIG. 3. In the AfterAll primitive, the flag element of the group_of_threads structure 300 is set (e.g., to the value "1") when the counter has incremented to a value that is equal to group_size of the group_of_threads structure 300. Note that the AfterAll primitive is called prior to the beginning of the task section of each thread that is to wait on completion of the task section before the marked point created by the Mark primitive.

In the example given above, the AfterAll primitive is provided before task section C. Thus, task section C in each thread is not performed until all threads have called the Mark primitive, resulting in the counter element of the group_of_threads structure 300 reaching a value equal to group_size of the group_of_threads structure 300. This is accomplished by the Wait command provided in the AfterAll primitive code 306. However, once the counter element has reached the value of group_size, the AfterAll primitive sets the flag element to the value "1", and exits its waiting state (Return command in the code 306), and allows the thread to continue processing, which in the above example is task section C.

As noted above, multiple instances of the Mark and AfterAll primitives can be called. If Mark is called multiple times, then multiple marked points are specified (each of the marked points can be identified by a corresponding distinct name). Multiple calls of the corresponding AfterAll primitive can be made to define coordination points corresponding to respective distinct marked points.

An example of how multiple points can be marked using multiple calls of the Mark primitive within a thread is provided below:

```
Thread(i):
    Task A_i
    Mark(Marker1);
    Task B_i
    AfterAll(Marker1);
    Task C_i
    Mark(Marker2);
    Task D_i
    AfterAll(Marker2);
    Task E_i
END
Parallel execution of Thread(i), i=1,......, n
```

In the example above, within each thread, after completion of task section A, the Mark primitive is called to mark the first marked point, identified by as Marker1. After the first Mark primitive is called to mark marked point Marker1, task section B is performed by the thread. Next, the AfterAll primitive is called, where the AfterAll primitive waits on the marked point Marker1. Assuming the task section A in all threads has been completed, task section C can proceed.

After completion of task section C, the thread calls the Mark primitive again, this time marking marked point Marker2. Next, task section D is performed, after which the AfterAll primitive is called that relates to the second marked point Marker2. Assuming task section C in all threads has completed, the AfterAll primitive that relates to Marker2 returns to allow the thread to proceed with execution of task section E.

Basically, the code section above guarantees that no thread's task section C can start before all threads' task section A are done and no thread's task section E can start before all threads' task section C are done.

The ability to define multiple marked points and corresponding coordination points allows for nesting (or overlapping) to be performed. Nesting of Mark and AfterAll primitives can be performed as follows, in one example:

```
Thread(i):
    Task A_i
    Mark(Marker1);
    Task B_i
    Mark(Marker2);
    Task C_i
    AfterAll(Marker2);
    Task D_i
    AfterAll(Marker1);
    Task E_i
```
End
Parallel execution of Thread(i), i=1,......, n In the code above associated with each thread, note that a first Mark primitive is called for Marker1 after completion of task section A in the thread, and a second Mark primitive is called for Marker2 after completion of task section B. After task section C completes, a first AfterAll primitive relating to Marker2 is called, and after task section D completes, a second AfterAll primitive is called that relates to Marker1. The code above includes a first combination of Mark and AfterAll (corresponding to Marker1), and a second combination of Mark and AfterAll (corresponding to Marker2) nested within the first combination.

For an overlapping example, the following code is provided:

```
Thread(i):
    Task A_i
    Mark(Marker1);
    Task B_i
    Mark(Marker2);
    Task C_i
    AfterAll(Marker1);
    Task D_i
    AfterAll(Marker2);
    Task E_i
End
Parallel execution of Thread(i), i=1,......, n
```

In the example code above, the second combination of Mark and AfterAll (corresponding to Marker2) overlaps but is not completely nested within the first combination of Mark and AfterAll (corresponding to Marker1).

Figure 4:
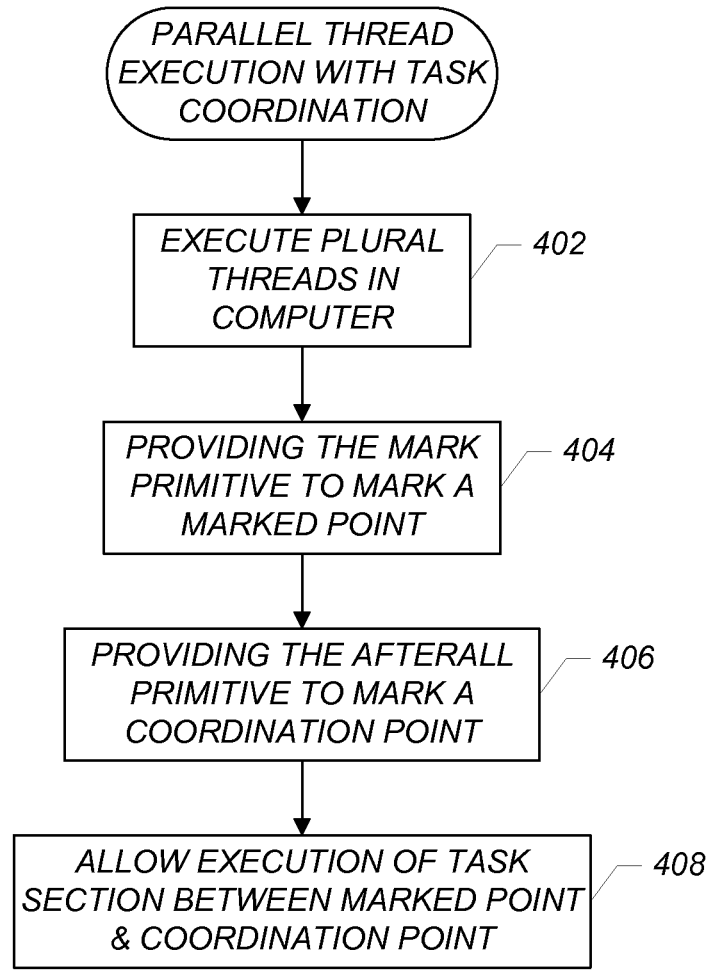
FIG. 4 is a flow diagram of a process of parallel execution of threads with coordination according to an embodiment.

FIG. 4 illustrates a general flow diagram of a process of parallel execution of threads with task coordination. Plural threads are executed (at 402) in parallel in the computer system. The Mark primitive is provided (at 404) in each of the threads to mark a marked point in each corresponding thread. Also, the AfterAll primitive is provided (at 406) in each of the threads to mark a coordination point relating to the marked point in each corresponding thread. To enhance efficiency and performance, one or more task sections are allowed (at 408) to execute between the marked point and the coordination point.

Instructions of software described above (including the threads 110, Mark primitive 102, and AfterAll primitive of FIG. 1) are loaded for execution on a processor (such as processor 108 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one or plural CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of coordinating tasks executed by a plurality of threads, comprising:
   executing the plurality of threads in a computer, wherein each of the threads includes plural task sections;
   in each of the threads, providing a call of a mark primitive to mark a first point after a first of the plural task sections;
   for each of the threads, executing, in the computer, the first of the plural task sections, and executing, in the computer, a second of the plural task sections between the first point and a start of a third of the plural task sections; and
   in each of the threads, providing a call of a second primitive to mark the start of the third of the plural task sections and to indicate that the third of the plural task sections is not allowed to begin until after the plurality of threads have each reached the first point.

2. The method of claim 1, wherein providing the call of the second primitive comprises providing the call of the second primitive that waits on all of the plurality of threads to reach the first point.

3. The method of claim 2, wherein all of the plurality of threads has reached the first point when all of the plurality of threads have called the mark primitive.

4. The method of claim 3, further comprising providing a data structure containing a counter, wherein each call of the mark primitive by a corresponding one of the threads results in incrementing the counter.

5. The method of claim 4, wherein all of the plurality of threads reaching the first point is indicated by the counter being incremented to a predefined value that is equal to a number of the plurality of threads.

6. The method of claim 1, further comprising providing a data structure containing at least one element accessed by the mark primitive and at least one element accessed by the second primitive to perform task coordination.

7. The method of claim 6, wherein the elements comprise a counter and a parameter specifying a number of the plurality of threads, wherein the counter is incrementable by the mark primitive.

8. The method of claim 7, further comprising:
   upon invocation by a corresponding thread, the second primitive checking to determine whether the counter has reached a value specified by the parameter;
   in response to determining that the counter has reached the value specified by the parameter, exiting the second primitive to allow the corresponding thread to continue execution; and
   in response to determining that the counter has not yet reached the value specified by the parameter, staying in a wait state and preventing the corresponding thread from proceeding further.

9. The method of claim 8, wherein the mark primitive and second primitive are implemented with a computer programming language that are called in code associated with each of the plurality of threads.

10. The method of claim 1, wherein the mark primitive and second primitive are part of a first combination, the method further comprising:
    providing a second combination of the mark primitive and second primitive to coordinate execution of further task sections of the plurality of threads.

11. The method of claim 10, wherein providing the second combination of the mark primitive and second primitive comprises providing the second combination of the mark primitive and second primitive nested within the first combination of the mark primitive and second primitive.

12. The method of claim 10, wherein providing the second combination of the mark primitive and second primitive comprises providing the second combination of the mark primitive and second primitive that overlaps the first combination of the mark primitive and second primitive.

13. A computer comprising:
    a storage medium to store a data structure containing elements to enable coordination among a plurality of threads executable in the computer; and
    at least one processor to:
      invoke a mark primitive in each of the threads after completing execution of a first section of the corresponding thread, wherein invoking the mark primitive causes a first element of the data structure to be updated;
      execute a second section of each of the threads between a point corresponding to the invoking of the mark primitive and a start of a third section of the corresponding thread; and
      invoke a second primitive in each of the threads to mark the start of the third section of the corresponding thread, wherein the second primitive causes the corresponding thread to wait on the first element reaching a predetermined value.

14. The computer of claim 13, wherein each of the mark primitive and second primitive is implemented with a computer programming language that allows the mark primitive and the second primitive to be called within code associated with each of the plurality of threads.

15. The computer of claim 13, wherein the first element of the data structure is a counter that is incremented with each invocation of the mark primitive.

16. The computer of claim 15, wherein the predetermined value is specified by a second element of the data structure.

17. The computer of claim 13, wherein the second primitive is to exit upon detecting that the first element has reached the predetermined value, wherein the second primitive exiting allows the corresponding thread to continue execution.

18. The computer of claim 13, wherein the mark primitive and second primitive are part of a first combination, wherein each of the threads is to further invoke a second combination of the mark primitive and second primitive that is nested within or overlaps the first combination.

19. An article comprising at least one non-transitory computer-readable storage medium containing instructions that upon execution cause a computer to:
  execute a plurality of threads in the computer, wherein each of the plurality of threads contains an invocation of a mark primitive after a first section of the corresponding thread, wherein the mark primitive marks a first point in the corresponding thread;
  execute a second section of each of the threads between the first point and a start of a third section of the corresponding thread, wherein each of the threads contains an invocation of a second primitive to mark the start of the third section of the corresponding thread; and
  wait, by the second primitive, for each of the plurality of threads to reach the first point prior to allowing the third section of the corresponding thread to continue execution,
  wherein each of the mark primitive and second primitive are implemented with a computer programming language.

20. A method of coordinating tasks executed by a plurality of threads, comprising:
  executing the plurality of threads in a computer, wherein each of the threads includes plural task sections:
  providing a call of a mark primitive to mark a first point after a first of the plural task sections for each of the threads;
  performing execution of the first of the plural of task sections and performing execution of a second of the plural task sections between the first point and a start of a third of the plural task sections of each of the threads;
  in each thread, providing a call of a second primitive to mark the start of the third of the plural task sections and to indicate that the third of the plural task sections is not allowed to begin until after the plurality of threads have each reached the first point;
  providing a data structure containing a counter and a parameter specifying a number of the plurality of threads, wherein the counter is incrementable by the mark primitive, and the counter and the parameter are accessed by the second primitive for each thread to perform task coordination upon invocation by a corresponding thread, the second primitive checking to determine whether the counter has reached a value specified by the parameter;
  in response to determining that the counter has reached the value specified by the parameter, exiting the second primitive to allow the corresponding thread to continue execution; and
  in response to determining that the counter has not yet reached the value specified by the parameter, staying in a wait state and preventing the corresponding thread from proceeding further.

* * * * *

UNITED STATES PATENT AND TRADEMARK OFFICE
CERTIFICATE OF CORRECTION

PATENT NO. : 8,904,406 B2  
APPLICATION NO. : 12/512256  
DATED : December 2, 2014  
INVENTOR(S) : Bin Zhang et al.

Page 1 of 1

It is certified that error appears in the above-identified patent and that said Letters Patent is hereby corrected as shown below:

In the Drawings

In sheet 1 of 3, reference numeral 103, line 3, delete "TREADS" and insert -- THREADS --, therefor.

Signed and Sealed this
Fourth Day of August, 2015

Michelle K. Lee  
*Director of the United States Patent and Trademark Office*